2,785,101
FUNGICIDAL COMPOSITIONS OF QUINONE-OXIME-HYDRAZONES

Ewald Urbschat, Koln-Mulheim, and Paul-Ernst Frohberger, Odenthal, Bezirk Koln, Germany, assignors to Farbenfabriken Bayer Aktiengesellschaft, Leverkusen, Germany, a corporation of Germany No Drawing. Application February 23, 1954,
Serial No. 412,096

Claims priority, application Germany February 25, 1953

7 Claims. (Cl. 167—30)

The present invention relates to useful improvements in fungicides; more particularly it is concerned with quinone oxime acyl hydrazones which are useful for rendering grain immune against attack by fungi.

Acyl azophenols are known to be highly efficacious disinfectants against seed grain diseases.

In accordance with the invention it has been found that quinone oxime acyl hydrazones, which do not reach the efficacy of the above mentioned compounds when applied in the combating of most seed grains diseases, have an extraordinary fungicidal activity against fungi causing germination diseases, for instance in leguminous plants, beets, maize, flax, cotton etc. infested by such fungi. The efficacy of the quinone oxime acyl hydrazones is by far superior to that of the above acyl azophenols. Therefore the compounds of the invention are highly potent seed grain disinfectants.

The term "quinone oxime acyl hydrazones" as herein used is contemplated to denote compounds corresponding to the general formula $$(HO-N=R=N-NH-X-)_nR_1$$

in which R stands for a mononuclear or multinuclear quinoidal aromatic radical, $R_1$ for hydrogen or an organic radical or, if $n$ is a number greater than one, for any desired link; the radical $R_1$ as well as the radical R may be substituted; $R_1$ is attached to X, directly or through a hetero atom such as O, N, or S; X stands for one of the following groups:

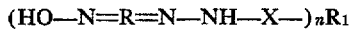

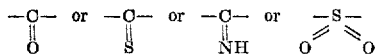

and $n$ is an integer.

These compounds are obtainable according to known processes, for instance by condensation of quinone monoximes or nitrosophenols with carboxylic acid hydrazides, thiocarboxylic acid hydrazides, sulphonic acid hydrazides, semicarbazides, thiosemicarbazides, or aminoguanidines.

Suitable quinone components according to the invention are for instance quinone monoxime, nitrosophenol, alkylnitrosophenols, halogenonitrosophenols, nitrosonaphthols and other hydroxynitroso compounds which are capable of reacting with the above hydrazides.

Examples of hydrazides which are useful for condensation with the quinone component are benzoic acid hydrazides, alkylbenzoic acid hydrazides, halogenobenzoic acid hydrazides, nitrobenzoic acid hydrazides, aminobenzoic acid hydrazide, dimethylaminobenzoic acid hydrazide, hydroxybenzoic acid hydrazide, alkoxybenzoic acid hydrazide, phenoxybenzoic acid hydrazide, formic acid hydrazide, acetic acid hydrazide, cyanoacetic acid hydrazide, propionic acid hydrazide, valeric acid hydrazide, lauric acid hydrazide, crotonic acid hydrazide, cinnamic acid hydrazide, hydroxybutyric acid hydrazide, hydroxyisovaleric acid hydrazide, hydroxyacetic acid hydrazide, alkoxyacetic acid hydrazides, phenoxyacetic acid hydrazides, thioacetic acid hydrazide, methylthioacetic acid hydrazide, alkylcarbonic acid hydrazides, phenylcarbonic acid hydrazide, phenylacetic acid hydrazide, naphthoic acid hydrazide, naphthylacetic acid hydrazide, pyromucic acid hydrazide, carbohydrazide, thiocarbonic acid hydrazide, oxalic acid dihydrazide, malonic acid dihydrazide and succinic acid hydrazide.

Condensation products of quinone oximes or nitrosophenols with aminoacetic acid hydrazide, methylaminoacetic acid hydrazide, dimethylaminoacetic acid hydrazide, trimethylammoniumchloride-acetic acid hydrazide or pyridiniumchloride-acetic acid hydrazide, may be employed in the form of their salts, for instance as chlorides, nitrates, phosphates, dithiocarbamates, thiocyanates, dinitrophenolates, or pentachlorophenolates.

The products obtainable from nitrosophenols and semicarbazide, phenylsemicarbazide, thiosemicarbazide, phenylthiosemicarbazide, dithiocarbazinic acid esters, aminoguanidine and benzoic sulfonic acid hydrazide are also suitable according to the invention.

The above named compounds are given only by way of illustration but it shall be understood that the scope of the invention shall by no means be restricted to the use of these compounds.

Germination diseases are already being controlled by means of metal-free substances such as tetramethylthiuram disulfide or 2,3-dichloro-naphthoquinone-1,4. Whereas these compounds must be applied in formulations containing at least 50% of active ingredient, quinone oxime acyl hydrazones, for instance quinone oxime benzoyl hydrazone, are effective in 10–15% formulations in the case of beets. In the latter case, the 2.5% formulations of the hydrazone proves to be at least equivalent to a disinfectant containing 2.2% Hg as phenyl-Hg-acetate, provided that the same quantities are applied. The products of the invention are the first mercury-free compounds that reach the fungicidal activity of organic mercury compounds.

For the purpose of seed disinfection, the quinone oxime acyl hydrazones are applied in the usual manner either as such or after addition of the customary diluents. They may also be applied in admixture with other fungicides or insecticides, and they may contain substances preventing birds from picking up the seed grain, or products improving their solubility or dispersibility or otherwise favourably affecting their properties.

The solutions of the quinone oxime acid hydrazones or their salts in suitable solvents may be used as seed disinfectants according to conventional methods.

The tests with polyembryonate sugar beets, which are described in the examples, were carried out with seed infected with root rot pathogens. The germination medium was compost containing root rot soil fungi. The germination temperatures were maintained at 10–15° C. These factors provided conditions that are considered most unfavourable for the development of the plants.

In the tests with leguminous plants, the infected seed (peas and beans) was disinfected in the usual manner and sown in compost containing fungi pathogenic to seedlings of leguminous plants, cultivation was carried out in the greenhouse at approx. 10° C. These conditions are extremely unfavorable to peas and especially to beans, because germination diseases are known to occur to a very large extent when the speed of germination is strongly delayed at low temperatures.

The invention is further illustrated by the following examples without being restricted thereto.

Example 1

A dry disinfectant containing 2.5% of quinone oxime benzoyl hydrazone in talcum was applied to polyembryonate sugar beet seed in an amount of 6 grams per kg. From 100 beet balls sown resulted 84 shooting-up spots from which 152 beet plants developed. During the next four weeks, only eight of these plants perished from root rot. Seed treated under entirely equal conditions including the beginning of the tests with a commercial dry disinfectant containing 2.2% of mercury showed 68 shooting-up spots from 100 balls sown, resulting in 134 beet plants; 64 plants thereof perished during the next four weeks. When untreated, the same seed resulted in 56 shooting-up spots which yielded 106 plants, 40 of which perished owing to root rot during the next four weeks.

Example 2

In another test carried out as described in the preceding example, application of the same disinfectant containing 2.5% of quinone oxime benzoyl hydrazone had the following result: shooting up spots with 170 plants were obtained from 100 beet balls. Only ten plants subsequently died off. After treatment of the seed with the Hg disinfectant, 62 shooting-up spots with 120 plants were obtained, 60 perishing. Untreated seed resulted in 46 shooting-up spots with 72 plants, 52 perishing.

In the same series of tests, the application of a disinfectant containing 10% of quinone oxime benzoyl hydrazone resulted in 80 shooting-up spots with 172 plants all of which were healthy even after four weeks. A 30% formulation of the dry disinfectant containing the same active ingredient and applied in an equal amount did not show any depression of germination. This proves that the substance is well tolerated by the seed.

Example 3

Pea seed was treated with a dry disinfectant containing 15% of quinone oxime benzoyl hydrazone in an amount of 2 grams per kg. and then cultivated as described above. After 24 days 100 peas had yielded 70 healthy plants. 45 healthy plants were obtained from seed treated with a commercial Hg-disinfectant, but only 20 healthy plants were obtained from untreated seed.

Example 4

After a test period of 24 days, 100 beans treated with a dry disinfectant containing 10% of quinone oxime benzoyl hydrazone in an amount of 2 grams per kg. produced 92 healthy and two sick plants. In the same test, application of the commercial Hg-disinfectant resulted in 81 healthy and 8 sick plants. The untreated seed produced only 3 plants.

Example 5

Wheat seed was artificially infected in the usual manner with 5 grams of smut spores per kg. and subsequently treated with a dry disinfectant containing 5% of quinone oxime benzoyl hydrazone in an amount of 2 grams per kg. In the spore germination test carried out by the Gassner method, the untreated seed showed an almost complete germination of the spores, whereas the spore germination of the treated seed was sporadic only.

In the following examples:
The tests—the results of which are summarised in the tables below—were carried out in the greenhouse with polyembryomate sugar beet seed infected with *Phoma betae* in compost infested with *Pythium debaryanum*. The temperatures during the tests varied between 10 and 20° C.

The compositions for use as dry disinfectants were extended with talcum.

Example 6

| No. | active substance | conc., percent Hg | amount in grams per 1 kg. of seed | number of the healthy shooting-up spots after sowing 100 balls | number of the healthy plants |
|---|---|---|---|---|---|
| | | | | after 4 weeks | |
| 1 | untreated | | | 40 | 66 |
| 2 | phenyl-Hg-acetate | 2.2 | 6 | 52 | 88 |
| 3 | quinone oxime-o-nitrobenzoyl-hydrazone. | 10 | 6 | 46 | 104 |
| 4 | quinone oxime-m-nitrobenzoyl-hydrazone. | 10 | 6 | 62 | 118 |
| 5 | quinone oxime-p-nitrobenzoyl-hydrazone. | 10 | 6 | 62 | 110 |
| 6 | ----do---- | 15 | 6 | 68 | 134 |
| 7 | quinone oxime-o-hydroxybenzoyl-hydrazone. | 15 | 6 | 56 | 100 |
| 8 | quinone oxime-p-chlorobenzoyl hydrazone. | 10 | 6 | 60 | 110 |
| 9 | ----do---- | 15 | 6 | 64 | 118 |
| 10 | quinone oxime-2-4-dichlorobenzoyl-hydrazone. | 10 | 6 | 66 | 130 |
| 11 | ----do---- | 15 | 6 | 64 | 122 |

Example 7

| No. | active substance | conc., percent Hg | amount in grams per 1 kg. of seed | number of the healthy shooting-up spots after sowing 100 balls | number of the healthy plants |
|---|---|---|---|---|---|
| | | | | after 4 weeks | |
| 1 | untreated | | | 49 | 74 |
| 2 | phenyl-Hg-acetate | 2.2 | 6 | 72 | 123 |
| 3 | quinone oxime cyanoacetyl hydrazone. | 10 | 6 | 82 | 168 |
| 4 | ----do---- | 15 | 6 | 80 | 182 |
| 5 | quinone oxime acetyl-hydrazone. | 10 | 6 | 70 | 180 |
| 6 | ----do---- | 15 | 6 | 90 | 196 |

Example 8

| No. | active substance | conc., percent Hg | amount in grams per 1 kg. of seed | number of the healthy shooting-up spots after sowing 100 balls | number of the healthy plants |
|---|---|---|---|---|---|
| | | | | after 4 weeks | |
| 1 | untreated | | | 20 | 30 |
| 2 | phenyl-Hg-acetate | 2.2 | 6 | 32 | 66 |
| 3 | quinone oxime carbonic acid ethylester-hydrazone. | 5 | 6 | 50 | 110 |
| 4 | ----do---- | 15 | 6 | 48 | 86 |
| 5 | quinone oxime-p-aminobenzoyl-hydrazone. | 5 | 6 | 52 | 101 |
| 6 | 2-methyl-quinone oxime-benzoyl-hydrazone. | 5 | 6 | 46 | 84 |
| 7 | ----do---- | 15 | 6 | 40 | 74 |
| 8 | 3-methyl-quinone oxime-benzoyl-hydrazone. | 5 | 6 | 40 | 114 |
| 9 | ----do---- | 15 | 6 | 46 | 92 |
| 10 | quinone oxime-formyl-hydrazone | 5 | 6 | 44 | 92 |
| 11 | ----do---- | 15 | 6 | 60 | 118 |
| 12 | quinone oxime-benzoyl-hydrazone sodium. | 5 | 6 | 34 | 60 |
| 13 | ----do---- | 15 | 6 | 52 | 90 |

Example 9

| No. | active substance | conc., percent Hg | amount in grams per 1 kg. of seed | after 4 weeks number of the healthy shooting-up spots after sowing 100 balls | number of the healthy plants |
|---|---|---|---|---|---|
| 1 | untreated | | | 28 | 40 |
| 2 | phenyl-Hg-acetate | 2.2 | 6 | 40 | 81 |
| 3 | quinone oxime-carbonic acid methylester-hydrazone. | 5 | 6 | 72 | 150 |
| 4 | ----do---- | 15 | 6 | 52 | 132 |
| 5 | quinone oxime-carbonic acid phenylester-hydrazone. | 5 | 6 | 50 | 104 |
| 6 | ----do---- | 15 | 6 | 62 | 130 |
| 7 | quinone oxime pyromucic acid hydrazone. | 5 | 6 | 74 | 154 |
| 8 | ----do---- | 15 | 6 | 52 | 132 |
| 9 | quinone oxime carbonic acid p-chloro-phenyl-ester-hydrazone. | 5 | 6 | 52 | 102 |
| 10 | ----do---- | 15 | 6 | 48 | 86 |
| 11 | quinone oxime methoxy-acetic acid hydrazone. | 5 | 6 | 62 | 136 |
| 12 | ----do---- | 15 | 6 | 64 | 128 |
| 13 | quinone oxime ethoxy-acetic acid hydrazone. | 5 | 6 | 54 | 114 |
| 14 | ----do---- | 15 | 6 | 46 | 96 |

Example 10

| No. | active substance | conc., percent Hg | amount in grams per 1 kg. of seed | after 4 weeks number of the healthy shooting-up spots after sowing 100 balls | number of the healthy plants |
|---|---|---|---|---|---|
| 1 | untreated | | | 39 | 79 |
| 2 | phenyl-Hg-acetate | 2.2 | 6 | 49 | 103 |
| 3 | quinone oxime hydroxy-acetic acid hydrazone. | 5 | 6 | 62 | 138 |
| 4 | ----do---- | 15 | 6 | 74 | 180 |

Example 11

| No. | active substance | conc., percent Hg | amount in grams per 1 kg. of seed | after 4 weeks number of the healthy shooting-up spots after sowing 100 balls | number of the healthy plants |
|---|---|---|---|---|---|
| 1 | untreated | | | 49 | 89 |
| 2 | phenyl-Hg-acetate | 2.2 | 6 | 63 | 158 |
| 3 | quinone oxime methylaminoacetic acid hydrazone-hydrochloride. | 5 | 6 | 66 | 176 |
| 4 | ----do---- | 15 | 6 | 76 | 176 |
| 5 | quinone oxime methylaminoacetic acid hydrazone. | 5 | 6 | 72 | 158 |
| 6 | ----do---- | 15 | 6 | 74 | 198 |
| 7 | quinone oxime acetic acid hydrazone-thiocyanate. | 5 | 6 | 76 | 154 |
| 8 | ----do---- | 15 | 6 | 80 | 204 |
| 9 | quinone oxime p-dimethylaminobenzoic acid hydrazone. | 5 | 6 | 84 | 172 |
| 10 | ----do---- | 15 | 6 | 70 | 156 |

Example 12

| No. | active substance | conc., percent Hg | amount in grams per 1 kg. of seed | after 4 weeks number of the healthy shooting-up spots after sowing 100 balls | number of the healthy plants |
|---|---|---|---|---|---|
| 1 | untreated | | | 38 | 58 |
| 2 | phenyl-Hg-acetate | 2.2 | 6 | 50 | 98 |
| 3 | quinone oxime phenylthiosemicarbazone. | 5 | 6 | 47 | 95 |

Example 13

| No. | active substance | conc., percent Hg | amount in grams per 1 kg. of seed | after 4 weeks number of the healthy shooting-up spots after sowing 100 balls | number of the healthy plants |
|---|---|---|---|---|---|
| 1 | untreated | | | 14 | 32 |
| 2 | phenyl-Hg-acetate | 2.2 | 6 | 34 | 64 |
| 3 | quinone oxime thiosemicarbazone. | 5 | 6 | 32 | 62 |
| 4 | quinone oxime aminoguanidyl hydrazone-nitrate. | 15 | 6 | 30 | 61 |

Example 14

| No. | active substance | conc., percent Hg | amount in grams per 1 kg. of seed | after 4 weeks number of the healthy shooting-up spots after sowing 100 balls | number of the healthy plants |
|---|---|---|---|---|---|
| 1 | untreated | | | 49 | 74 |
| 2 | phenyl-Hg-acetate | 2.2 | 6 | 72 | 123 |
| 3 | quinone oxime benzene sulfonic hydrazone. | 15 | 6 | 65 | 107 |

Example 15

| No. | active substance | conc., percent Hg | amount in grams per 1 kg. of seed | after 4 weeks number of the healthy shooting-up spots after sowing 100 balls | number of the healthy plants |
|---|---|---|---|---|---|
| 1 | untreated | | | 28 | 42 |
| 2 | phenyl-Hg-acetate | 2.2 | 6 | 32 | 66 |
| 3 | 2-chloroquinone oxime benzoylhydrazone. | 15 | 6 | 30 | 58 |
| 4 | α-naphthoquinone oxime benzoyl-hydrazone. | 15 | 6 | 30 | 61 |

In the following examples different seeds are treated with a composition of different quinone oxime acylhydrazones in the form of a dry seed disinfectant formulation (with talcum).

Example 16.—(Grain of mustard-seed)

| No. | active substance | conc., percent Hg | amount in grams per 1 kg. of seed | healthy plants from 100 sown seeds |
|---|---|---|---|---|
| 1 | untreated | | | 52 |
| 2 | phenyl-Hg-acetate | 2.2 | 2 | 70 |
| 3 | quinone oxime benzoyl hydrazone | 5 | 2 | 76 |

Example 17.—(Lupine-seed)

| No. | active substance | conc., percent Hg | amount in grams per 1 kg. of seed | healthy plants from 100 sown seeds |
|---|---|---|---|---|
| 1 | untreated | | | 22 |
| 2 | phenyl-Hg-acetate | 2.2 | 2 | 28 |
| 3 | quinone oxime benzoyl-hydrazone | 5 | 2 | 50 |

Example 18.—(Cucumber-seed)

| No. | active substance | conc., percent Hg | amount in grams per 1 kg. of seed | healthy plants from 100 sown seeds |
|---|---|---|---|---|
| 1 | untreated | | | 19 |
| 2 | phenyl-Hg-acetate | 2.2 | 2 | 35 |
| 3 | quinone oxime benzoyl-hydrazone | 5 | 2 | 55 |
| 4 | do | 15 | 2 | 66 |

Example 19.—(Cotton-seed)

| No. | active substance | conc., percent Hg | amount in grams per 1 kg. of seed | healthy plants from 100 sown seeds after 4 weeks |
|---|---|---|---|---|
| 1 | untreated | | | 64 |
| 2 | phenyl-Hg-acetate | 2.2 | 6 | 78 |
| 3 | quinone cyanoacetyl hydrazone | 5 | 6 | 74 |
| 4 | do | 10 | 6 | 78 |
| 5 | quinone oxime acetyl hydrazone | 5 | 6 | 88 |
| 6 | do | 10 | 6 | 74 |
| 7 | quinone formyl hydrazone | 5 | 6 | 82 |
| 8 | do | 10 | 6 | 78 |
| 9 | do | 15 | 6 | 78 |
| 10 | do | 0.01 | (1) | 88 |
| 11 | quinone oxime benzoyl hydrazone | 10 | 6 | 72 |
| 12 | do | 20 | 6 | 74 |

[1] Immersing for 16 hours.

Example 20.—(Linseed)

| No. | active substance | conc., percent Hg | amount in grams per 1 kg. of seed | healthy plants from 100 sown seeds after 4 weeks |
|---|---|---|---|---|
| 1 | untreated | | | 70 |
| 2 | phenyl-Hg-acetate | 2.2 | 2 | 80 |
| 3 | quinone oxime cyanoacetyl hydrazone | 5 | 2 | 77 |
| 4 | do | 10 | 2 | 82 |
| 5 | quinone oxime acetyl-hydrazone | 5 | 2 | 82 |
| 6 | quinone oxime formyl-hydrazone | 10 | 2 | 79 |
| 7 | do | 20 | 2 | 78 |
| 8 | sodium salt of quinone oxime benzoyl-hydrazone | 5 | 2 | 83 |
| 9 | do | 20 | 2 | 81 |
| 10 | quinone oxime benzoyl-hydrazone | 10 | 2 | 87 |
| 11 | do | 20 | 2 | 81 |

Example 21.—(Maize)

| No. | active substance | conc., percent Hg | amount in grams per 1 kg. of seed | healthy plants from 100 sown seeds after 4 weeks |
|---|---|---|---|---|
| 1 | untreated | | | 12 |
| 2 | phenyl-Hg-acetate | 2.2 | 2 | 62 |
| 3 | quinone oxime acetyl-hydrazone | 10 | 2 | 68 |
| 4 | do | 20 | 2 | 72 |
| 5 | quinone oxime formyl-hydrazone | 10 | 2 | 62 |
| 6 | do | 20 | 2 | 62 |
| 7 | quinone oxime benzoyl-hydrazone | 10 | 2 | 60 |
| 8 | do | 20 | 2 | 64 |

Example 22

Seeds of barley infected with *Ustilago nuda* are treated with a solution of an active quinone oxime acylhydrazone. After treatment the seeds are sown in the field.

| No. | active substance | mode of application and quantity | average attack in percent |
|---|---|---|---|
| 1 | untreated | | 6 |
| 2 | methoxyethyl-Hg-silicate | 1.75% Hg dry substance 2 g. to 1,000 g. barley seed. | 3.6 |
| 3 | quinone oxime formyl-hydrazone | 16 hours swelling of 600 g. barley seed in a solution of 50 g. of quinone oxime formyl-hydrazone in 1,000 g. of water. | 1.5 |
| 4 | do | in the same manner in a solution of 300 mg. of quinone oxime formylhydrazone in 1,000 g. of water. | 0.4 |
| 5 | sodium salt of quinone oxime benzoyl-hydrazone | 16 hours swelling of 600 g. barley seed in a solution of the sodium salt of quinone oxime phenylhydrazone in 1,000 g. of water. | 1.5 |
| 6 | do | in the same manner in a solution of 300 mg. of the sodium salt of quinone oxime phenylhydrazone in 1,000 g. of water. | 1.3 |

Example 23

Seeds of wheat are contaminated with spores of *Tilletia tritici* in an amount of 5 g. per 1 kg. of seed. After contamination the seed is treated with a dry seed dressing (talcum).

| No. | active substance | conc., percent Hg | amount in grams per 1 kg. of seed | |
|---|---|---|---|---|
| 1 | untreated | | | germination of spores. |
| 2 | methoxy-ethyl-Hg-silicate | 1.75 | 1 | no germination of spores. |
| 3 | 2-methyl-quinone oxime benzoyl-hydrazone | 30 | 1 | Do. |
| 4 | do | 15 | 1 | Do. |
| 5 | do | 5 | 1 | Do. |
| 6 | 3-methyl-quinone oxime benzoyl-hydrazone | 30 | 1 | Do. |
| 7 | do | 15 | 1 | less germination of spores |

Example 24

In this example the tests—the results of which are summarised in the table below—were carried out in the greenhouse with polyembryomate sugar beet seed infected with *Phoma betae* in compost infested with *Pythium debaryanum*. The seeds are treated with quinone oxime benzoyl- or formyl-hydrazones as follows:

| No. | active substance | conc., percent Hg | quantity | number of the healthy shooting-up spots after sowing 100 balls | number of the healthy plants |
|---|---|---|---|---|---|
| 1 | untreated | | | 24 | 42 |
| 2 | phenyl-Hg-acetate | 2.2 | 6 to 1,000 | 66 | 136 |
| 3 | slurry-seed dressing of quinone oxime benzoyl-hydrazone with 10% emulsifier and 70% caoline. | 20 | 2 g. +13 g. water | 50 | 128 |
| 4 | wet seed disinfectant of quinone oxime benzoyl-hydrazone in a solution of 20% Na₂CO₃+60% Na₂SO₄. | 1 | 6 l./100 kg | 54 | 108 |
| 5 | like 4 | 5 | 6 l./100 kg | 50 | 128 |
| 6 | wet seed dressing of quinone oxime formyl-hydrazone (80% NaHCO₃). | 2.5 | 6 l./100 kg | 60 | 128 |
| 7 | like 6 | 5 | 6 l./100 kg | 43 | 116 |
| 8 | liquid seed dressing of 5% quinone oxime benzoyl-hydrazone (2% NaOH, 1% wetting agent). | | 6 g./1 kg | 60 | 160 |

What we claim is:

1. A fungicidal composition containing as an active fungicidal substance a quinone-oxime-acylhydrazone having the following general formula:

$$(HO-N=R=N-NH-x-)_{n^1}-R^1$$

in which R is a quinone radical, $R^1$ is a member selected from the group consisting of hydrogen and organic radicals, $x$ is a radical chosen from the group consisting of

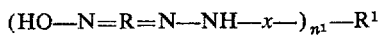

and $n^1$ is an integer not higher than 2, and a carrier.

2. A fungicidal composition containing as an active fungicidal substance a quinone-oxime-acylhydrazone having the following general formula:

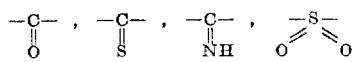

in which $x$ is a member selected from the group consisting of

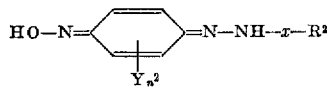

$R^2$ is a member selected from the group consisting of hydrogen, alkyl amino-alkyl, oxi-alkyl, mercapto-alkyl, cyanoalkyl, aralkyl, and aryl radicals Y is a member selected from the group consisting of halogen and alkyl radicals, containing from 1–4 carbon atoms, and $n^2$ is an integer selected from the group consisting of 0, 1 and 2, and a carrier.

3. A fungicidal composition containing as an active fungicidal substance a quinone-oxime-acylhydrazone having the following general formula:

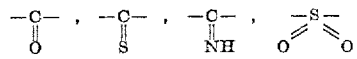

in which $x$ is a member selected from the group consisting of

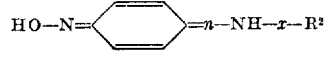

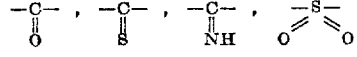

$R^2$ is a member selected from the group consisting of hydrogen, alkyl amino-alkyl, oxi-alkyl, mercapto-alkyl, cyanoalkyl, aralkyl, and aryl radicals, and a carrier.

4. A fungicidal composition containing as an active fungicidal substance a quinone-oxime-acylhydrazone having the following general formula:

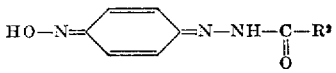

in which $R^2$ is a member selected from the group consisting of hydrogen, alkyl amino-alkyl, oxi-alkyl, mercapto-alkyl, cyano-alkyl, aralkyl, and aryl radicals, and a carrier.

5. A fungicidal composition containing as an active fungicidal substance a quinone-oxime-acylhydrazone having the following general formula:

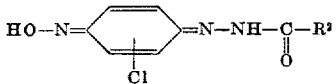

in which $R^2$ is a member seelcted from the group consisting of hydrogen, alkyl amino-alkyl, oxi-alkyl, mercapto-alkyl, cyano-alkyl, aralkyl, and aryl radicals, and a carrier.

6. A fungicidal composition containing as an active fungicidal substance a quinone-oxime-acylhydrazone having the folowing general formula:

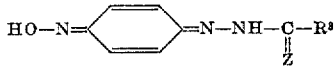

in which Z is a member selected from the group consisting of O, S and NH and $R^3$ is a member selected from the group consisting of $OR^4$, $OR^4$ being an alkyl radical having from 1 to 4 carbon atoms and phenyl radicals, and a carrier.

7. A fungicidal composition containing as an active fungicidal substance quinone-oxime - benzoylhydrazone, and a carrier.

References Cited in the file of this patent

UNITED STATES PATENTS 2,429,099    Ladd _____ Oct. 14, 1947

UNITED STATES PATENT OFFICE

CERTIFICATE OF CORRECTION

Patent No. 2,785,101                                                      March 12, 1957

Ewald Urbschat et al.

It is hereby certified that error appears in the printed specification of the above numbered patent requiring correction and that the said Letters Patent should read as corrected below.

Columns 4, 5, 6, 7, 8, 9 and 10, Examples 6 through 21, and Examples 23 and 24, in the heading of the tables, third columns thereof, line 3, strike out "Hg", each occurrence; same Examples 6 through 21, and Example 24, in the tables, third columns thereof, opposite No. 2, for "2.2", each occurrence, read -- 2.2 Hg --; column 8, Example 23, in the table, third column thereof, opposite No. 2, for "1.75" read -- 1.75 Hg --; column 9, line 51, and column 10, lines 26, 35 and 46, for "oxi-alkyl", each occurrence, read -- oxy-alkyl --; column 10, line 57, for "$OR^4$, $OR^4$" read -- $OR^4$, $R^4$ --.

Signed and sealed this 3rd day of September 1957.

(SEAL)
Attest:

KARL H. AXLINE                                               ROBERT C. WATSON
Attesting Officer                                         Commissioner of Patents